April 30, 1940.　　　J. GLAENZER　　　2,199,222
ARTICLE OF JEWELRY
Filed May 3, 1939
Fig. 1
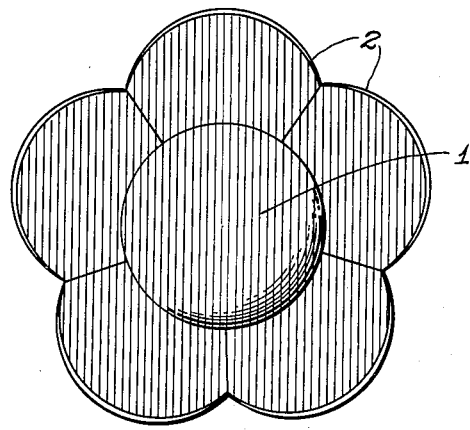
Fig. 2
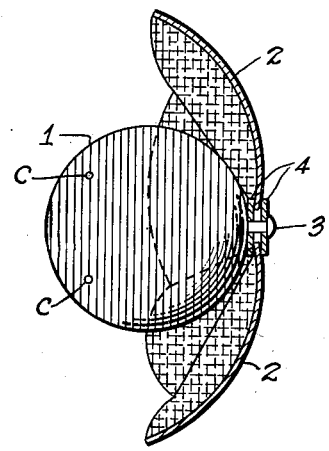
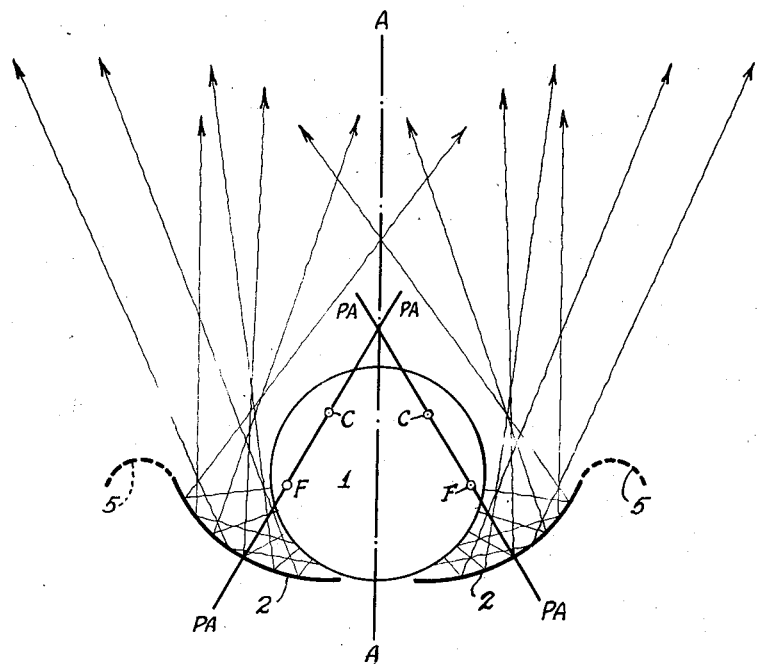
Fig. 3
INVENTOR.
Jules Glaenzer
BY
Cornelius Zabriskie
ATTORNEY.

Patented Apr. 30, 1940

2,199,222

UNITED STATES PATENT OFFICE 2,199,222

ARTICLE OF JEWELRY

Jules Glaenzer, New York, N. Y., assignor to Cartier, Inc., New York, N. Y., a corporation of New York Application May 3, 1939, Serial No. 271,483

6 Claims. (Cl. 63—32)

This invention relates to jewelry and is directed more particularly to the production of novel and unusual effects in the grouping of gems and associated metallic parts for the purpose of producing the optical illusion of color in one part of the structure by light emanating from another part thereof.

More specifically and by way of example, the present invention provides a construction whereby in a flower having petals of a particular shape may be grouped about a centrally located gem, such as a ruby, in such manner that light emanating from the ruby will impinge the contiguous faces of the flower petals to impart to the petals the color of the gem. This effect may be produced by positioning the gem centrally of an assembly of the petals of particular shape and so disposed with reference to the gem that one looking at the faces of the petals will see the gem by reflected light, with the optical result that the petals will be colored in accordance with the gem.

I am aware that it has been heretofore proposed to make flower forms with glass or gem centers. Sometimes a single gem has been used and sometimes a plurality of gems or even beads of glass have been employed, but these prior constructions do not embody the present invention for, when they are observed, the colors of the petals do not match the colors of the gem or gems and the gems do not effect the optical coloring of the petals.

In order to obtain the color effect described, it is essential that there be substantially definite relation between the gem, or other equivalent element of the structure, and the petals and that the petals be of a predetermined shape and character. These petal must be of reflective character, they must be so formed as to constitute concave reflectors and they must be so positioned with respect to the gem that one viewing the open top of the flower will receive the color of the gem both by direct light from the gem and by reflected light from the petals. The structure of the present invention comprises a centrally located gem and, about the same, a cluster of mirrors arranged in circumferential annular sequence with their respective principal axes intersecting one another in the axis of the gem and set at such inclination that one viewing the gem through its open top will receive reflected light from the gem by way of the mirrors.

In the best form of the invention, as embodied in flower forms, each petal forms in substantial entirety a concave mirror in order that the entire mirror face of the petal will be colored as specified. However, if it is desired to color only a portion of the petal, that portion may be made in the form of a concave mirror as stated while the remainder of the petal may be otherwise shaped in accordance with any predetermined design, but the latter portion of the petal may then not necessarily be optically colored as is the concave reflective portion.

Features of the invention, other than those adverted to, will be apparent from the hereinafter detailed description and claims, when read in conjunction with the accompanying drawing.

The accompanying drawing illustrates one practical embodiment of the invention, but the construction therein shown is to be understood as illustrative, only, and not as defining the limits of the invention.

Figure 1 is a face view of an article of jewelry embodying the present invention.

Figure 2 is a section on the line 2—2 of Figure 1.

Figure 3 is a diagrammatic view showing how the results claimed for the present invention are produced.

Referring first to Figure 3, 1 indicates a gem, here shown as spherical although the same may be of any desired shape. It may be a precious gem in either natural or cut form, or it may be a glass bead.

2 designates a concave hollow spherical section, the upper surface of which is reflective. Two of these sections are shown, one on either side of the vertical axis A of the gem 1, but in practice a number of them are arranged in annular relation about the lower portion of the gem in fixed spaced relation from the axis A and where they intersect they are cut along radial planes including the axis A and soldered or otherwise joined together. They may, however, be made collectively in one piece by stamping or casting them. The upper face of each spherical section 2 is smooth and polished and constitutes in effect a mirror. Gold has been used for this purpose and found to give highly satisfactory results. It has in some cases been lacquered clear although this is not necessary. With this formation it will appear that each of the elements 2 constitutes a concave mirror, the principal axis of which is designated PA. The center of curvature is indicated at C and the focal point is indicated at F.

Prolonged experimentation in connection with this subject matter has demonstrated that, in order to completely obtain the results which I desire, it is essential to so associate each mirror 2 with the gem that its principal axis will intersect the gem. With this arrangement, I have observed that, when the assembly is viewed from the top, every line of sight from the eye of the observer to each and every mirror will be reflected into the gem, or, conversely, every portion of each concave mirror will be illuminated by rays of light from the gem and these rays, reflected to the eye of an observer appear as of the same color as the gem. Accordingly, if the gem is a ruby the mirrors will appear red.

In Figure 3 the behavior of rays of light in one particular plane is illustrated and, while I have obviously not attempted to show all rays of light in such plane, the diagram illustrates the present invention and shows the reason why this invention will produce the results described and why these results do not flow from prior flower forms which embody gems.

In Figure 3 the center of curvature C of each mirror is within the body of the gem 1. I find this to give the best results although the arrangement will function if the center C is exterior of the gem provided, however, that the principal axis PA passes through some part of the gem. The focal points of the mirrors in Figure 3 are also shown interiorly of the gem and this structure gives a marked brilliancy of reflection, but if the mirrors were tilted outwardly at a greater angle so as to bring the focal point of each of them without the body of the gem, the arrangement would give a somewhat wider angle of vision.

To obtain the best results, the mirrors should be so positioned that their reflecting surfaces, or an extension thereof, will intersect the gem. This is apparent from Figure 3 where if the arc of curvature of each mirror is continued in the direction of the axis A it will enter the gem. Furthermore the portion of the mirror nearest to the axis A should be fairly close to the gem for if appreciable space is here present, a line of sight along the chord of the arc of the mirror will neither engage the mirror nor the gem but will engage a blind spot where no color is transmitted either by direct or reflected light.

I have set forth the considerations which I have found to produce an optically perfect structure. I wish it understood, however, that slight deviations from this preferred structure may nevertheless give results sufficiently good for all practical purposes. For example, the great majority of users might not object if there was a small optically colorless spot in the structure provided, of course, that the desired effect was present in a substantially complete degree. The invention is therefore not intended to be limited to the optically perfect structure, but is to be considered as a practical construction and curves and spacings which will give practical satisfaction are within the purview of this invention.

Figures 1 and 2 show an article of jewelry fabricated in accordance with the principles hereinbefore described and in these figures a ruby 1 is shown positioned within a flower form comprising five petals 2, each a concave mirror, and arranged in annular relation, so that the ruby constitutes the center of the assembly. Inasmuch as the ruby is red, I have indicated it with appropriate lining to show this color and have similarly indicated such color upon the reflective faces of the petals.

As shown in Figure 2, the petals 2 are secured together about the axis of the gem and the gem is held in place by a pin 3 through the base of the petal assembly with small washers 4 to facilitate the assembly. If an emerald were employed in place of a ruby the coloring would of course be green for the coloring will depend upon the gem employed.

The structure shown in Figures 1 and 2 embodies the optical principles described in conjunction with Figure 3 and illustrates a flower form wherein all of the petals will partake of the color of the gem and all parts of each petal will be optically colored as stated. However, there may be times when a jewelry designer desires that certain portions of each petal be free from such coloring. This may be accomplished, for example, by forming at the outer periphery of each of the petals a convex lip 5, as indicated in dotted lines in Figure 3. Such a lip will reflect light only at isolated points in wide angle vision and would, to all intents and purposes, retain its natural color when viewed from any angle. Nevertheless an appreciable part 2 of each petal will be of concave mirror form and the present invention will be present in the structure, even though not incorporated in the added part 5.

It may be here noted that the intensity of the coloring will of course depend upon the intensity of the light in which the gem is seen and to some extent upon the angle at which it is observed and to some extent also upon the angle at which the several principal axes of the mirrors are inclined with respect to the gem and to one another. This angle of inclination of the principal axes in some cases produces the effect of merely coloring the reflecting surfaces of the petals while in other cases it may so color the petals as to give the effect of independent gems so as to produce an optical illusion of a cluster of gems of which only the center one is real. The present invention is thus capable of producing extremely beautiful optical effects.

The foregoing detailed description sets forth the invention in its preferred practical form, but the invention is to be understood as fully commensurate with the appended claims.

The element 1 may be a gem, either natural or artificial, or a bead of glass, or other material which will transmit light. In the appended claims I have referred to the element 1 generically as a gem but the claims are not to be construed in a limiting sense in this connection.

Having thus fully described the invention, what I claim as new and desire to secure by Letters Patent is:

1. An article of jewelry comprising a gem, and a succession of concave substantially spherical reflector portions each having its own independent axis positioned in annular sequence about the base of the gem and respectively tilted in the direction of the gem, so that when the surfaces of said reflector portions are viewed they will reflect the surface of the gem.

2. An article of jewelry comprising a gem, and a succession of concave substantially spherical reflector portions each having its own independent axis positioned in annular sequence about the base of the gem with their principal axes intersecting the gem.

3. An article of jewelry comprising a gem, and a succession of concave substantially spherical reflector portions each having its own independent axis positioned in annular sequence about the base of the gem with their principal axes and the continuation of the arcs of their reflecting surfaces intersecting the gem.

4. An article of jewelry comprising an annular series of concave substantially spherical reflector portions each having its own independent axis grouped about a centrally disposed gem and tilted at such angle with respect to one another and to the gem as to reflect the color of the gem from substantially all parts of said reflector portions.

5. An article of jewelry comprising a plurality of substantially spherical reflector portions each having its own independent axis arranged in annular sequence about a central axis, and a gem positioned with substantial symmetry about said axis, said reflector portions being tilted toward said axis and gem to such extent as to reflect the color of the gem when said reflector portions are viewed from any point in said axis from which said portions are visible.

6. An article of jewelry comprising a centrally disposed gem, and concave substantially spherical reflector portions each having its own independent axis grouped about said gem and in which reflector portions the surface of the gem may be observed.

JULES GLAENZER.